(12) United States Patent
Willis et al.

(10) Patent No.: US 11,643,090 B2
(45) Date of Patent: May 9, 2023

(54) ROUTE-BASED SELECTIONS OF VEHICLE PARAMETER SETS

(71) Applicant: BlackBerry Limited, Waterloo (CA)

(72) Inventors: Edward Snow Willis, Ottawa (CA); Christopher Scott Travers, Ottawa (CA); Conrad Delbert Seaman, Ottawa (CA); Claude Jean-Frederic Arzelier, Molieres-sur-Ceze (FR); Stephen McCann, Southampton (GB); Michael Peter Montemurro, Toronto (CA)

(73) Assignee: BlackBerry Limited, Waterloo (CA)

( * ) Notice: Subject to any disclaimer, the term of this patent is extended or adjusted under 35 U.S.C. 154(b) by 164 days.

(21) Appl. No.: 16/580,952

(22) Filed: Sep. 24, 2019

(65) Prior Publication Data
US 2020/0122736 A1 Apr. 23, 2020

(30) Foreign Application Priority Data

Oct. 17, 2018 (EP) ..................................... 18306363

(51) Int. Cl.
*B60W 50/00* (2006.01)
*B60W 30/18* (2012.01)
*B60W 40/02* (2006.01)
*G07C 5/02* (2006.01)
*G07C 5/08* (2006.01)

(52) U.S. Cl.
CPC ............ *B60W 50/00* (2013.01); *B60W 30/18* (2013.01); *B60W 40/02* (2013.01); *G07C 5/02* (2013.01); *G07C 5/0808* (2013.01); *B60W 2400/00* (2013.01); *B60W 2554/00* (2020.02); *B60W 2555/20* (2020.02); *B60W 2556/00* (2020.02)

(58) Field of Classification Search
CPC combination set(s) only.
See application file for complete search history.

(56) References Cited

U.S. PATENT DOCUMENTS 5,420,794 A    5/1995 James
7,139,660 B2  11/2006 Sarkar
(Continued)

FOREIGN PATENT DOCUMENTS

WO    2912163771    12/2012
WO    2016100668    6/2016

OTHER PUBLICATIONS

European Patent Office, Extended European Search Report for Appl. No. 18306363.5 dated Feb. 28, 2019 (8 pages).
(Continued)

*Primary Examiner* — Peter D Nolan
*Assistant Examiner* — Mikko Okechukwu Obioha
(74) *Attorney, Agent, or Firm* — Trop, Pruner & Hu, P.C.

(57) ABSTRACT

In some examples, a controller receives information of a route of a vehicle, and selects a first parameter set from among a plurality of parameter sets based on the route of the vehicle, the plurality of parameter sets corresponding to different conditions of usage of the vehicle, where each parameter set of the plurality of parameter sets includes one or more parameters that control adjustment of one or more respective adjustable elements of the vehicle. The controller causes application of the first parameter set to control a setting of the one or more adjustable elements of the vehicle.

18 Claims, 3 Drawing Sheets

(56) References Cited

U.S. PATENT DOCUMENTS

| | | |
|---|---|---|
| 7,685,162 B2 | 3/2010 | Heider |
| 7,873,452 B2 | 1/2011 | Hawkins et al. |
| 8,560,155 B2 | 10/2013 | Kedar-Dongarkar et al. |
| 9,079,505 B1 | 7/2015 | Hyde et al. |
| 9,110,774 B1 | 8/2015 | Bonn |
| 9,428,197 B2 | 8/2016 | Chen |
| 2005/0274553 A1 | 12/2005 | Salman et al. |
| 2007/0208467 A1 | 9/2007 | Macguire et al. |
| 2012/0323413 A1 | 12/2012 | Kedar-Dongarkar |
| 2013/0282202 A1 | 10/2013 | Gau |
| 2015/0275788 A1* | 10/2015 | Dufford ............ B60W 50/0097 701/1 |
| 2016/0200166 A1 | 7/2016 | Stanek et al. |
| 2016/0280040 A1* | 9/2016 | Connell ................. G06Q 10/00 |
| 2017/0137023 A1* | 5/2017 | Anderson ............. B60G 17/02 |
| 2017/0137026 A1 | 5/2017 | Hemes |
| 2018/0022187 A1 | 1/2018 | Connell |
| 2018/0059687 A1 | 3/2018 | Hayes et al. |
| 2018/0099646 A1 | 4/2018 | Karandikar |
| 2018/0201264 A1 | 7/2018 | Schoenly |
| 2018/0266834 A1* | 9/2018 | Cronin ............... G01C 21/3664 |
| 2018/0297607 A1 | 10/2018 | Willis |
| 2018/0297608 A1* | 10/2018 | Willis ............... B60W 50/0098 |
| 2019/0001981 A1* | 1/2019 | Thunga Gopal .... F02N 11/0818 |
| 2019/0049981 A1 | 2/2019 | Fischer |
| 2019/0212161 A1* | 7/2019 | Pedersen ............ G01C 21/3476 |
| 2019/0329771 A1* | 10/2019 | Wray ............. B60W 30/18163 |
| 2020/0173802 A1* | 6/2020 | Thunga Gopal ... G01C 21/3492 |
| 2020/0269875 A1* | 8/2020 | Wray ................... G05D 1/0088 |
| 2021/0127271 A1* | 4/2021 | Wu ..................... H04W 12/102 |

OTHER PUBLICATIONS

AA1CAR, Engine Coolant Sensors dated on or before Feb. 2017 (13 pages).

Chris Perkins, Koenigsegg Can Remotely Adjust the Suspension on Their Cars From Anywhere in the World, Dec. 13, 2016 (10 pages).

European Patent Office, Communication pursuant to Article 94(3) EPC for Appl. No. 18306363.5 dated Jan. 17, 2022 (5 pages).

* cited by examiner

ROUTE-BASED SELECTIONS OF VEHICLE PARAMETER SETS

CROSS REFERENCE TO RELATED APPLICATION

This application claims the benefit of European Appl. No. 18306363.5 filed Oct. 17, 2018, which is hereby incorporated by reference.

BACKGROUND

A vehicle such as a car or other type of vehicle can be used to carry people or goods from one location to another location. A vehicle can include a large number of separate parts, including mechanical parts, electronic control units (ECUs), and other components. The ECUs are used to control various different functions of a vehicle. Operational components, including ECUs, other electronic components, and so forth, of vehicles can be configured using configuration settings. Similarly, other types of electronic devices, such as Internet of Things (IoT) devices, can also be configured using configuration settings.

BRIEF DESCRIPTION OF THE DRAWINGS

Some implementations of the present disclosure are described with respect to the following figures.

Figure 1:
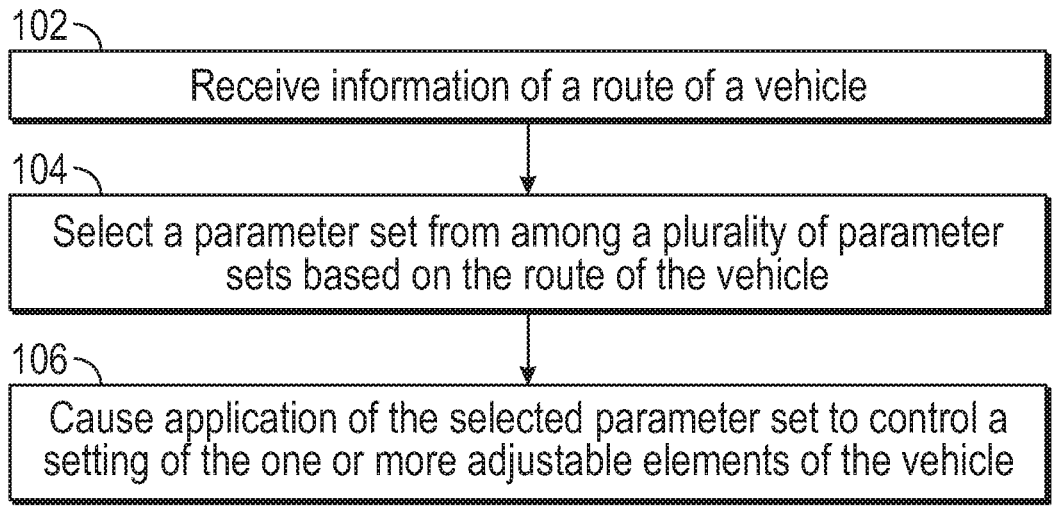
FIGS. 1 and 2 are flow diagrams of processes of providing a configuration setting to a vehicle, according to some implementations.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A vehicle can refer generally to any machine that is used to carry people, goods, and/or other payload from one physical location to another physical location. A vehicle can be driven by a human driver, or can be an autonomous vehicle that is able to drive itself. Examples of vehicles include any or some combination of the following: a truck, a trailer, a tractor, a car, a railed vehicle (e.g., a train), a watercraft (e.g., a ship, a submarine), an aircraft, a spacecraft, and so forth. A vehicle can also refer to a drone, which is an un-manned vehicle that can be used to perform various different actions. A vehicle can include wheels to move between different physical locations over land. Alternatively, a vehicle can include structures such as wings to allow the vehicle to fly through the air, or floatation structures to sail on or through water.

In addition to a large number of mechanical parts, a vehicle can also include various operational components, such as electronic control units (ECUs) or other electronic components, as well as other components that can operate to perform tasks relating to the vehicle. In the present disclosure, ECUs can also be referred to as "controller units." An ECU can refer to any embedded computing system that is part of the vehicle to control one or more subsystems in the vehicle. An ECU can be implemented with a processor, or with multiple processors. Examples of subsystems that can be controlled by ECUs include an engine of a vehicle, a transmission of the vehicle, a brake subsystem of the vehicle, a valve of the vehicle, an air-conditioning subsystem of the vehicle, a navigation subsystem of the vehicle, and so forth.

An operational component can be configured to operate at one of various different settings based on a configuration parameter (or a set of configuration parameters) provided to the operational component. As used here "a configuration parameter set" (or more simply, a "parameter set") can include one or more configuration parameters that control a setting of an operational component. For example, a parameter set can include one or more configuration parameters that control an idle speed of an engine, a setting of a transmission, a timing of a valve, operation of a brake (e.g., how much pressure to apply, etc.), operation of an air-conditioning system, operation of a navigation subsystem, operation of an adjustable suspension, operation of an adjustable aerodynamic shroud, pressure of a tire, and so forth.

Generally, a manufacturer or an operator of a vehicle can provide parameter sets to the vehicle that are based on a range of operating conditions of usage that the vehicle is expected or anticipated to operate under. The parameter sets are intended to strike a balance between the different types of conditions that the vehicles may encounter. As a result, the parameter sets provided to the vehicle may not be optimal for certain conditions. Over the course of a journey, the efficiency of the vehicle may suffer as conditions change in different segments of a route, where the reduced efficiency can be in the form of one or more of: reduced miles-per-gallon performance, increased wear on components (e.g., wear of a brake or tire, wear of an engine, etc.), and so forth. For an enterprise (such as a shipper, distributor, retailer, and so forth) that operates a large number of vehicles (such as to carry cargo or people), even a relatively small reduction in efficiency can substantially increase costs to the enterprise. By optimizing parameter sets for vehicles, improvements in efficiency can have a large impact on reducing costs for vehicles, particularly for an operator of a large fleet of operators. Also, by optimizing parameter sets for vehicles, increased efficiency can be achieved, such as by increasing the miles-per-gallon performance of the vehicle, or reducing wear on components, and so forth.

In accordance with some implementations of the present disclosure, techniques or mechanisms are provided to select one or more parameter sets for a vehicle based on a planned or anticipated route for the vehicle. In some examples, as shown in FIG. 1, a controller receives (at 102) information of a route of a vehicle. Information of the route of the vehicle can include a sequence of location information (e.g., geographic coordinates, road names, etc.) that specifies route segments that the vehicle is to traverse for a journey (or multiple journeys).

Note that a route can be a predetermined route or a route that can change on the fly as the vehicle proceeds on its trip. Within any route from location A to location X, there may be route segments of the route that cannot be changed, but there may be another route segment (or other route segments) that is (are) associated with a number of different route options depending on various factors, such as time of day, traffic, and so forth.

In the present discussion, a "planned route" or "route" can refer to a route provided to the vehicle ahead of the trip, or a route that has been changed once the vehicle is underway.

The controller selects (at 104) a parameter set from among a plurality of parameter sets based on the route of the vehicle. The plurality of parameter sets corresponding to different conditions of usage of the vehicle, where each parameter set of the plurality of parameter sets includes one or more parameters that control adjustment of one or more respective adjustable elements of the vehicle. The controller causes (at 106) application of the selected parameter set to control a setting of the one or more adjustable elements of the vehicle.

The selection of the parameter set can be based on an analysis or prediction performed by the controller to determine or estimate one or more expected conditions of the route.

Conditions of the route can include any or some combination of the following: a length of the route (e.g., long-haul versus short-haul), a temperature condition (a temperature of an environment of the vehicle), a weather condition (e.g., rainy, dry, snowy, icy, etc.), a vehicular traffic condition of a road along the route, a load condition (the expected load, in terms of an amount of cargo and/or number of people that the vehicle is expected to carry in a respective route segment), a terrain (e.g., hilly or mountainous terrain, flat terrain, rough terrain, smooth terrain, etc.), a road type (e.g., city road or highway road, etc.), and so forth.

For example, for a high temperature condition, a parameter set can be selected to set the transmission of the vehicle to operate at a lower gear to reduce the chances of overheating the vehicle. As another example, for a high altitude condition, a parameter set can be selected to change the timing of a valve to optimize engine operation at the high altitude. As a further example, for a high load condition, a parameter set can be selected to increase the stiffness of a suspension. As yet another example, for a rough terrain condition, a parameter set can be selected to reduce the stiffness of a suspension). As yet a further example, for a long-haul route, a parameter set can be selected to adjust the engine and transmission for optimal performance at highway speeds.

In other examples, other parameter sets can be selected for making other adjustments of adjustable elements of vehicles.

The determination of the conditions of a route can be based on information from various information sources accessible by the controller. Note that the conditions of the route, or a route segment, can change with time. For example, during rush hour, a road segment through a city may be congested with traffic, while during late night or early morning hours, the road segment may have light traffic.

Examples of the information sources accessible locally by the controller or over a network include one or more of: a weather site that provides weather information by geographic locations, a traffic site or online map that provides traffic information (including any traffic incidents such as vehicular accidents or stalls) along roads, a data repository containing information describing terrains of roads (e.g., the type of road, such as paved or unpaved road, the slope of the road, the elevation of the road, a city road, a highway road, a road with many traffic lights or stop signs, a toll road, etc.), a data repository containing information regarding where cargo or people are to be dropped off or pickled up by the vehicle, and so forth.

In further examples, some or all of the information sources can be integrated into fewer or even a single information source.

The parameter sets from which the controller can make a selection can be stored in a data repository locally or remotely accessible by the controller. The parameter sets may have been developed by an enterprise that operates the controller, or alternatively, the parameter sets may be provided by a third-party enterprise.

The controller that can perform the process of FIG. 1 can either be part of the vehicle or external of the vehicle (e.g., at a server or other computer that is coupled to the vehicle over a network). As used here, a "controller" can refer to a hardware processing circuit, which can include any or some combination of a microprocessor, a core of a multi-core microprocessor, a microcontroller, a programmable integrated circuit, a programmable gate array, or another hardware processing circuit. Alternatively, a "controller" can refer to a combination of a hardware processing circuit and machine-readable instructions (software and/or firmware) executable on the hardware processing circuit.

Figure 2:
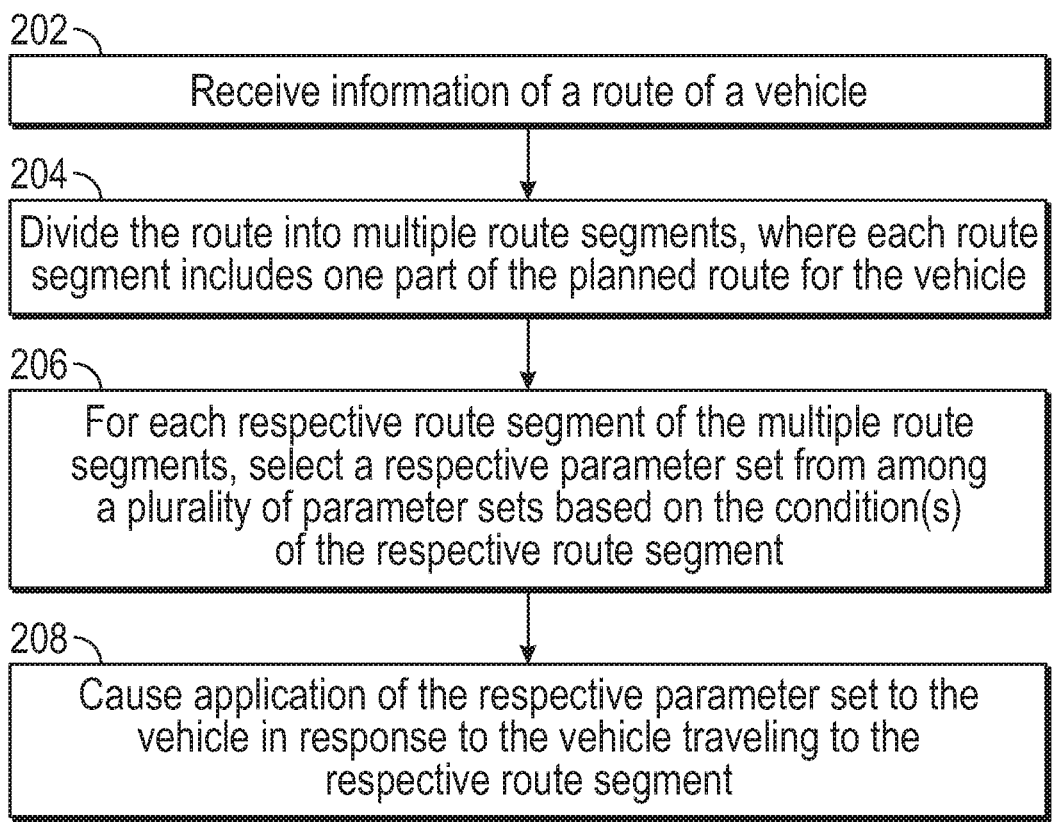

FIG. 2 is a flow diagram of a process according to further examples. A controller receives (at 202) information of a route of a vehicle. The controller divides (at 204) the route into multiple route segments, where each route segment includes one part of the planned route for the vehicle. The dividing of the route into the multiple route segments can be based on an analysis and/or prediction of conditions along the route.

Note that the route segments can change if the route changes on the fly. For example, a route may pass through locations A, B, C, and D, where A-B is a first route segment, B-C is a second route segment, and C-D is a third route segment. In some examples, an original route may have planned for the B-C segment to pass through city roads. Later, due to a change in plans or conditions, the B-C segment may be changed to include a highway that bypasses the city. These different route options for the B-C segment may be associated with different conditions, which can cause different parameter sets to be selected.

Based on identifying different conditions along the route, the controller can determine the route segments. For example, the controller can detect that different road segments have different characteristics (e.g., highway road versus city road). Thus, the controller can identify a first route segment as including city roads, and a second route segment as including a highway. As another example, a route (or route portion) is divided into a first route segment and a second route segment in response to the controller determining or predicting that the condition(s) of the first route segment differs from the condition(s) of the second route segment by greater than one or more specified thresholds. In a more specific example, a route (or route portion) is divided into the first route segment and the second route segment in response to the controller determining or predicting that a temperature of an environment of the first route segment differs from a temperature of an environment of the second route segment by greater than a specified temperature threshold. As another specific example, a route (or route portion) is divided into the first route segment and the second route segment in response to the controller determining or predicting that the terrain of the first route segment differs from the terrain of the second route segment by greater than a specified terrain threshold (e.g., a measure of a slope of the terrain, a measure of a roughness of the terrain to indicate whether the terrain is paved or unpaved, etc.). As another specific example, a route (or route portion) is divided into the first route segment and the second route segment in response to the controller determining or predicting that the load condition of the vehicle in the first route segment differs from the load condition of the vehicle in the second route segment by greater than a specified load threshold (e.g., a weight of the load). As another specific example, a route (or route portion) is divided into the first route segment and the second route segment in response to the controller determining or predicting that the altitude of the first route segment differs from the altitude of the second route segment by greater than a specified altitude threshold.

In further examples, determination of the route segments can be based on identifying time periods along the route when new parameter sets can be applied at the vehicle. For example, the identified time periods can include time periods when the vehicle is expected to be idle, such as an overnight stop, a scheduled rest stop, etc.

For each respective route segment of the multiple route segments, the controller selects (at 206) a respective parameter set from among a plurality of parameter sets based on the condition(s) of the respective route segment.

In some examples, a table or other data structure can be used to map route segments to respective parameter sets. The controller can access this data structure to select different parameter sets for different route segments.

An example table is set forth below:

| Route segment | Parameter Set |
| --- | --- |
| Route segment 1 (flat desert road) | Parameter set 1 |
| Route segment 2 (flat unpaved road) | Parameter set 2 |
| Route segment 3 (steep road) | Parameter set 3 |

Another example table can map a combination of a route segment and another characteristic, such as cargo load and/or another characteristic, to respective parameter sets.

As yet another example, different route segments can be annotated with information of respective conditions of the different route segments. Thus, instead of using a data structure that maps route segments to parameter sets as discussed above, the route segments can be annotated with their respective conditions, which can change over time. In addition, correlation information (e.g., a "schema") can be provided that maps different conditions (e.g., high altitude, low altitude, sea level, hot/dry weather, hot/wet weather, cold/dry weather, cold/wet weather, hilly road, flat road, etc.) to different parameter sets. The controller can then select a parameter set based on the annotation data associated with a respective route segment.

The controller then causes (at 208) application of the selected parameter set to the vehicle in response to the vehicle traveling to the respective route segment. As a result, as the vehicle travels from one route segment to another route segment, a parameter set used by the vehicle can change.

In some examples, changing the parameter set of the vehicle can be performed while the vehicle is at a stop point, such as a rest stop, a gas station, parked in a parking lot or other location, and so forth. In other examples, the parameter set of the vehicle of the vehicle can be changed while the vehicle is in motion. In yet further examples, the controller can cause application of a new parameter set to the vehicle in response to a request from a user.

Figure 3:
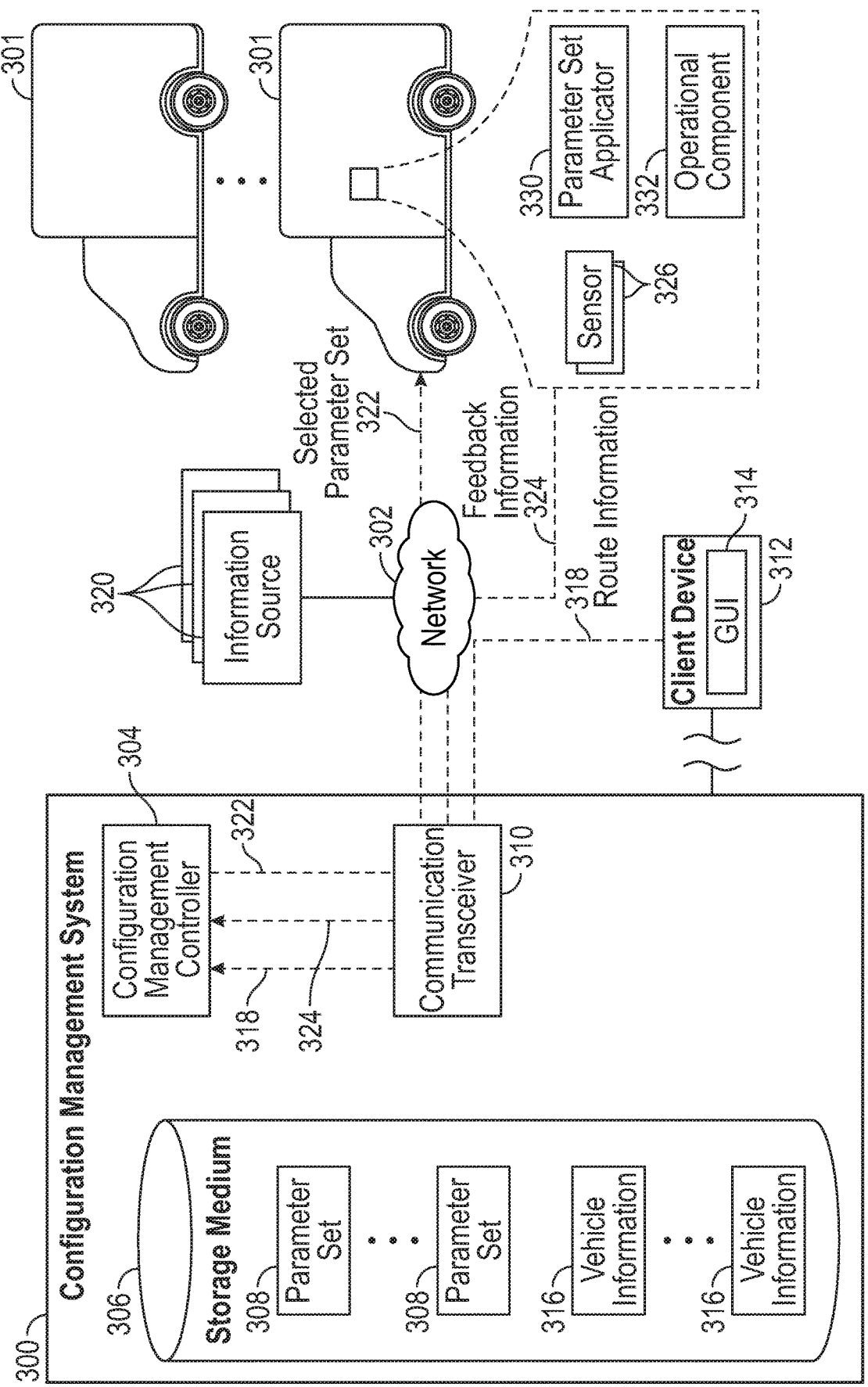
FIG. 3 is a block diagram of an example arrangement to provide configuration settings to vehicles according to some implementations.

FIG. 3 is a block diagram of an example arrangement that includes a configuration management system 300 that can be used to manage configuration settings of vehicles 301. The configuration management system 300 is able to deliver various parameter sets to vehicles over a network 302, which can be a wireless network or a wired network.

A wireless network can include a cellular access network or a wireless local area network (WLAN). An example cellular network can operate according to the Long-Term Evolution (LTE) standards as provided by the Third Generation Partnership Project (3GPP). The LTE standards are also referred to as the Evolved Universal Terrestrial Radio Access (E-UTRA) standards. In other examples, other types of cellular networks can be employed, such as second generation (2G) or third generation (3G) cellular networks, e.g., a Global System for Mobile (GSM) cellular network, an Enhanced Data rates for GSM Evolution (EDGE) cellular network, a Universal Terrestrial Radio Access Network (UTRAN), a Code Division Multiple Access (CDMA) 2000 cellular network, and so forth. In further examples, cellular networks can be fifth generation (5G) new radio (NR) or beyond cellular networks.

A WLAN can operate according to the Institute of Electrical and Electronic Engineers (IEEE) 802.11 or Wi-Fi Alliance Specifications. In other examples, other types of wireless networks can be employed, such as a Bluetooth link, a ZigBee network, and so forth. Additionally, some wireless networks can enable cellular Internet of Things (IoT), such as wireless access networks according to LTE Advanced for Machine-Type Communication (LTE-MTC), narrowband IoT (NB-IoT), and so forth.

The configuration management system 300 includes a configuration management controller 304 that is able to selectively deliver parameter sets to respective vehicles 301, such as using a process according to FIG. 1 or 2.

In other examples, instead of deploying the configuration management controller 304 in a system that is remote from a vehicle 301, the configuration management controller 304 can instead be deployed as part of a vehicle 301. As yet another example, the configuration management controller 304 can be deployed in an electronic device (e.g., a notebook computer, a tablet computer, a smartphone, etc.) carried by the operator of the vehicle 301 and may also be tethered to the vehicle 301 either by wired or wireless communications.

A storage medium 306 stores various parameter sets 308. The storage medium 306 can be implemented with a disk drive, a collection of disk drives, a solid state memory, a collection of solid state memories, and/or other types of storage media.

The parameter sets 308 can provide different parameters for a specific operational component of vehicles. For example, the parameter sets 308 can relate to different configuration settings of an engine, a transmission, and so forth.

The storage medium 306 can store multiple collections of parameter sets for respective different operational components of vehicles, where each collection of parameter sets specify different configuration settings for a respective operational component of a vehicle.

The storage medium 306 can be part of the configuration management system 300, or can be remote from the configuration management system 300, but is accessible by the configuration management system 300, such as over the network 302.

The configuration management system 300 also includes a communication transceiver 310 that allows the configuration management system 300 to communicate over the network 302 with the vehicles 301. The communication transceiver 310 can include a wireless transceiver to transmit and receive wireless signals, or a wired transceiver to communicate over a wired network.

FIG. 3 further shows a client device 312 that is coupled to the configuration management system 300. The client device 312 can be a user device, such as a notebook computer, desktop computer, tablet computer, smartphone, and so forth, which can be used by a user (e.g., a fleet administrator) to manage configurations of vehicles. The client device 312 can execute an application that allows the client device 312 to interface with the configuration management controller 304. The application executed on the client device 312 can present a management graphical user interface (GUI) 314, which allows the client device 312 to interact with the configuration management controller 304.

In some examples, the management GUI 314 can be used by an administrator to define the parameter sets 308. The management GUI 314 allows the administrator to provide information relating to vehicles to the configuration management system 300, which can store the information as vehicle information 316 in the storage medium 306, for example. The vehicle information 316 can identify the vehicles 301 with vehicle identifiers or vehicle names, for example. The vehicle information 316 can also specify operational components that can be controlled using configuration parameters.

The client device 312 can be directly connected (tethered over a wireless link or wired link) to the configuration management system 300, or the client device 312 can be coupled over the network 302 to the configuration management system 300. Examples of a wired link include a Controller Area Network (CAN) bus, an Ethernet network, and so forth.

Although FIG. 3 shows just one client device 312 coupled to the configuration management system 300, it is noted that in other examples, multiple client devices can be coupled to the configuration management system 300 to allow multiple administrators to manage provision of parameter sets to respective vehicles. If multiple administrators provision conflicting parameter sets (e.g., different parameter sets for a given route or route segment), then the configuration management system 300 can resolve this conflict based on any of various factors, such as priorities assigned to the administrators (e.g., a higher priority administrator's parameter set is used), an order agreed upon by the administrators or set by an organization (e.g., the parameter set from a first administrator is considered first over the parameter set from a second administrator).

The client device 312 (or a different device) can be used to provide, to the configuration management controller 304, route information 318 regarding a planned route to be traveled by a vehicle 301 (or by multiple vehicles 301). In other examples, the route information 318 can be obtained by the configuration management controller 304 from a different source.

Based on the planned route, the configuration management controller 304 can access information sources 320 (including those listed above) to determine conditions along the planned route. Based on the determined conditions, the configuration management controller 304 is able to divide the planned route into multiple route segments and/or select one or more selected parameter sets 322 from the plurality of parameter sets 308 from the storage medium 306 to apply to the vehicle(s) 301 for the planned route or respective route segments. A selected parameter set 322 can be applied to the vehicle right before the start of the trip, or during the trip such as at stop points or while the vehicle is traveling.

It may also be possible for the configuration management controller 304 to assign a vehicle that is already configured with the selected parameter set 322. In this sense there may be a plurality of vehicle pools, each pool having vehicles that are pre-configured with different parameter sets. For each journey or route that is being managed by the configuration management controller 304, the configuration management controller 304 can assign or recommend a pool of vehicles, or a specific vehicle from within the pool, having the selected parameter set 322.

Each selected parameter set 322 is transmitted by the configuration management controller 304 over the network 302 to the vehicle(s) 301, to apply the configuration settings in the selected parameter set 322 to configure adjustable element(s) of the vehicle(s) 301. A selected parameter set 322 can be transmitted to a vehicle 301 before a trip, or the selected parameter set 322 can be transmitted to the vehicle 301 during the trip.

The vehicle 301 includes a parameter set applicator 330 to apply the received selected parameter set 322 to at least one operational component 332 of the vehicle 301. The parameter set applicator 330 can be implemented as a controller, which can be a hardware processing circuit or a combination of a hardware processing circuit and machine-readable instructions executable on the hardware processing circuit.

The parameter set applicator 330 can write the received selected parameter set 322 to the operational element 332, such as to store in a storage medium of the operational element 332. In examples where the operational component 332 is an ECU, the ECU can include a storage medium (not shown) to store configuration information, and the selected parameter set 322 can be written to the storage medium as part of the configuration information.

The configuration management controller 304 is able to use an algorithm to select a parameter set from among the multiple parameter sets 308. The algorithm can include a correlation data structure (e.g., a mapping table) that correlates different conditions to different parameter sets to use, for any given type of vehicle (or group of vehicles). Alternatively, the algorithm can include a machine learning model that can be trained using training data that specifies which parameter sets to use for which conditions.

In some examples, a vehicle 301 is able to provide feedback information 324 back to the configuration management controller 304. Although FIG. 3 shows the feedback information 324 being provided by one vehicle 301, it is noted that in other examples, multiple vehicles 301 can provide feedback information 324 to the configuration management controller 304.

After the selected parameter set 322 is provided to the vehicle 301 to configure adjustable elements of the vehicle 301, one or more sensors 326 in the vehicle 301 can measure metrics associated with operations of the adjustable elements. The measured metrics are used to derive the feedback information 324 that is sent back to the configuration management controller 304. The feedback information 324 allows the configuration management controller 304 to monitor information relating to an operation of the vehicle configured using the selected parameter set 322.

The one or more sensors 326 in the vehicle 301 can also measure metrics associated with conditions around the vehicle 301. The one or more sensors 326 for measuring the conditions can include one or more of: a temperature sensor to measure a temperature of an environment around the vehicle 301, an altitude sensor to measure an altitude of the vehicle 301, a load sensor to measure a load of the vehicle 301, a terrain-detecting sensor to determine the type of terrain over which the vehicle 301 is travelling, a distance sensor to determine a travel distance of the vehicle 301, or any other type of sensor.

A load sensor can include a time-of-flight (ToF) sensor, where a light signal can be emitted, and reflection from a surface can be captured by a light sensor to determine a distance to the surface. This distance can provide an indication of a loading of the vehicle. In another example, the load sensor can include a weight sensor, such as a strain gauge or other type of weight sensor mounted to the suspensions of the vehicle. The measured weight provides an indication of loading of the vehicle.

A terrain-detecting sensor can include a camera to capture an image of the terrain, and to detect the type of terrain based on image processing of the captured image of the terrain. Alternatively or additionally, the terrain-detecting sensor can include a shock or vibration sensor to detect a force or vibration exerted on the vehicle as the vehicle moves over the pavement, which can give an indication of the type of terrain. A terrain-detecting sensor can also measure the slope of the road on which the vehicle is traveling.

A distance tracker can include a position sensor (e.g., a global positioning system (GPS) receiver) to detect a location of the vehicle. Multiple measurements by the position sensor can provide an indication of a distance traveled by the vehicle. Alternatively, the distance tracker can be part of the odometer of the vehicle, and can output a distance traveled since a last reading of the odometer.

The feedback information 324 provides a feedback loop that allows the configuration management controller 304 to evaluate whether the selected parameter set 322 is achieving an improvement in operational characteristics at one or more vehicles 301. Examples of operational characteristics at one or more vehicles 301 include any or some combination of: a fuel efficiency (e.g., miles per gallon), a wear of a vehicle component (e.g., wear of a brake, tire, or engine exceeds a threshold rate), an amount of deposits (e.g., carbon deposits) in an engine of the vehicle, an amount of emissions (e.g., of certain pollutants) from the vehicle, and so forth. An operational characteristic after the selected parameter set has been applied can be measured, and can be compared to values of the operational characteristic of the same vehicle or other similar vehicles to determine whether there has been a substantial improvement in the operational characteristic (e.g., an improvement of over X %, where X is a specified threshold value).

If the feedback information 324 indicates that the selected parameter set 322 is not achieving a desired improvement (less than X % improvement) in operational characteristics at one or more vehicles 301, then the configuration management controller 304 can either adjust one or more of the parameter sets 308 or adjust the algorithm that maps conditions to parameter sets.

In some cases, an enterprise may operate a fleet of vehicles. There may be certain routes or types of routes (e.g. long haul, short haul, hot weather climate, cold weather climate, high altitude, low altitude or any combination of the same) that recur for the vehicles of the fleet. In some examples, the configuration management controller 304 is able to divide the fleet of vehicles into multiple subsets of vehicles, with different subsets of vehicles assigned to travel along respective different routes. For example, a first subset of vehicles can be assigned to travel a first route, along with selected one or more parameter sets, a second subset of vehicles can be assigned to travel a second route, along with selected one or more parameter sets, and so forth.

Dividing the fleet of vehicles into multiple subsets of vehicles can allow vehicles that have properties more optimal for certain routes to be used on those routes, rather than other vehicles that may be less efficient for those routes. For example, vehicles with aero-dynamic shrouds may be more efficient to use on long-haul routes, vehicles with adjustable suspensions may be more efficient to use on unpaved roads, and so forth. Once a vehicle from the appropriate subset of vehicles is selected for a planned route, then techniques or mechanisms according to some implementations can be used to use information of the planned route to select a parameter set for application at the vehicle for the planned route.

In further examples, the feedback information 324 allows the configuration management controller 304 to monitor information relating to operations of vehicles or groups of vehicles configured using respective different test parameter sets for a given type of route. Based on the monitoring, the configuration management controller 304 can identify a parameter set of the different test parameter sets as being optimal for the given type of route. As a result, the configuration management controller 304 can use the identified optimal parameter set for vehicles that are to travel along the given route or type of route. Using the identified optimal parameter set may comprise updating the parameter set for vehicles in a subset identified as being configured with a non-optimal parameter set.

In some examples, it may be possible to compare feedback from different test groups of vehicles in order to compare the improvements from each different parameter set. The vehicle(s) in each test group of vehicles (a group can include one or more vehicles) can be configured using a respective parameter set (e.g., the vehicle(s) of a first test group can be configured using a first parameter set, the vehicle(s) of a second test group can be configured using a different second parameter set, and so forth). It may be possible to divide a pool of vehicles into collections of vehicles that travel respective similar route types (i.e. long haul, short haul, hot weather climate, cold weather climate, high altitude, low altitude or any combination of the same). If each vehicle in a given collection is the same type or substantially similar type, and if vehicles in the given collection all travel a similar type of route, then it is possible to further divide the given collection of vehicles into different test groups, where each test group has a different parameter set for all or a portion of a route. Feedback information from the different test groups can be used to compare the effectiveness of the different parameter sets such that further refinement of the parameter sets is possible.

In some implementations, a controller is configured to receive information of a route (e.g., a specific route, a segment of a route, or a route type) and to identify a plurality of vehicles that are to travel the route. The plurality of vehicles are split into different test groups each configured with respective different parameter sets.

In further implementations, a controller is configured to receive feedback information from a plurality of test groups of vehicles configured using different parameter sets for a route (e.g., a specific route, route segment or a route type). The controller is configured to use the feedback information to compare the effectiveness of the different parameter sets for the route or a portion of the route.

Based on the comparison of the effectiveness of the different parameter sets for the route or a portion of the route, the controller can update one or more of the different parameter sets. The controller can also update one of the test groups to adopt the parameter set tested by another of the test groups.

In some examples, one (or more than one) of the parameter sets 308 can be identified as a safe-mode parameter set. The safe-mode parameter set can be selected by the configuration management controller 304 for a given vehicle in response to the configuration management controller 304 detecting that the given vehicle has experienced a malfunction or is in a degraded state (e.g., engine malfunction, brake failure, tire puncture or loss, etc.). The safe-mode parameter set includes configuration parameters that can cause the given vehicle to operate at a reduced setting (e.g., a lower maximum speed, a lower engine speed, etc.), to ensure a safe operating condition of the given vehicle while the given vehicle is in the compromised condition.

In further examples, the configuration management controller 304 can also detect a deviation of a given vehicle from its planned route. For example, the feedback information 324 from the given vehicle can include location information (e.g., GPS coordinates, etc.) that allows the configuration management controller 304 to determine whether the given is following its planned route. In response to detecting a deviation of the given vehicle from its planned route, the configuration management controller 304 selects a different parameter set (different from the initially selected parameter set 322) to control the setting of the one or more adjustable elements of the given vehicle.

Figure 4:
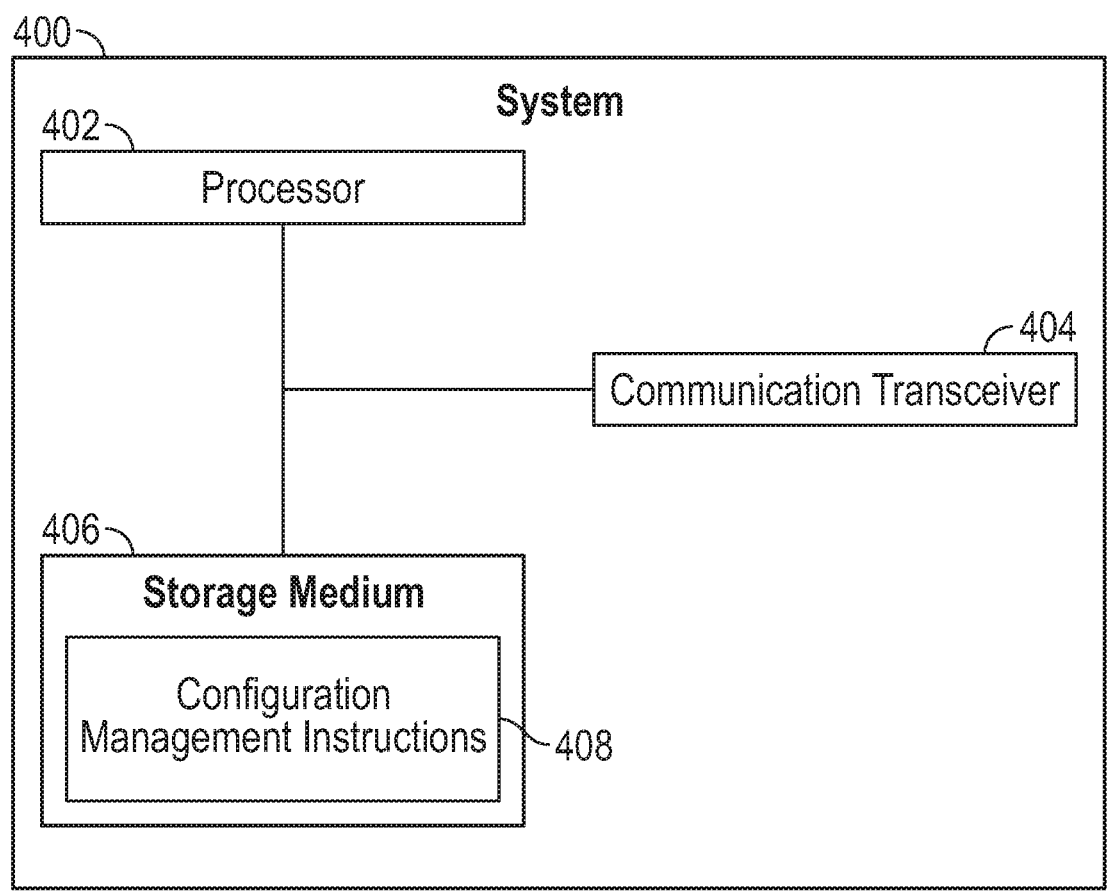
FIG. 4 is a block diagram of a system according to some examples.

FIG. 4 is a block diagram of a system 400 according to some examples. The system 400 can include the configuration management system 300 of FIG. 3, or a vehicle 301, or a user device.

The system 400 includes a processor 402 (or multiple processors). A processor can include a microprocessor, a core of a multi-core microprocessor, a microcontroller, a programmable integrated circuit, a programmable gate array, a digital signal processor, or another hardware processing circuit.

The system 400 further includes a communication transceiver 404 to communicate over a network, such as a cellular system for backhaul communications to the Internet. In addition, the system 400 includes a non-transitory machine-readable or computer-readable storage medium 406 storing machine-readable instructions executable on the processor 402 to perform respective tasks. Machine-readable instructions executable on a processor can refer to the instructions executable on a single processor or the instructions executable on multiple processors.

The machine-readable instructions include configuration management instructions 408 that are able to perform tasks of the configuration management controller 304 and/or other similar tasks.

The storage medium 406 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A controller comprising:
   at least one processor configured to:
   receive, from a device, information of a planned route for a trip of a vehicle, the planned route comprising a plurality of route segments including a first route segment;
   select, for use in the first route segment during the trip, a first parameter set from among a plurality of parameter sets based on the planned route of the vehicle, the plurality of parameter sets corresponding to different conditions of usage of the vehicle, wherein each parameter set of the plurality of parameter sets includes one or more parameters that control adjustment of one or more adjustable elements of the vehicle;
   detect, during the trip of the vehicle, a change in the planned route resulting in a changed route that includes a second route segment in place of the first route segment;
   select, for use in the second route segment during the trip, a second parameter set from among the plurality of parameter sets based on the changed route of the vehicle;
   cause application of the second parameter set during the trip to control a setting of the one or more adjustable elements of the vehicle;
   detect that the vehicle has experienced a malfunction;
   in response to the detecting that the vehicle has experienced the malfunction, select a safe-mode parameter set to control the setting of the one or more adjustable elements of the vehicle;
   monitor information relating to an operation of the vehicle configured using the second parameter set;
   based on the monitoring, adjust an algorithm that maps different conditions of usage of vehicles to respective different parameter sets; and
   configure another vehicle using the adjusted algorithm.

2. The controller of claim 1, wherein the at least one processor is configured to predict a first expected condition of usage of the vehicle for the first route segment, and the first parameter set is for the first expected condition of usage as mapped by the algorithm.

3. The controller of claim 1, wherein the at least one processor is configured to:
   divide the planned route into the plurality of route segments, wherein the dividing comprises:
   predicting a first expected condition of usage of the vehicle for the first route segment, and
   predicting a different second expected condition of usage of the vehicle for a third route segment that is part of the plurality of route segments.

4. The controller of claim 1, wherein the different conditions of usage of the vehicle comprise different altitudes at which the vehicle is to be operated, and wherein the first parameter set is for a first altitude of the different altitudes, and the at least one processor is configured to select the second parameter set based on predicting that the second route segment includes a second altitude of the different altitudes, the second altitude being different from the first altitude.

5. The controller of claim 1, wherein the change in the planned route occurred on the fly during the trip, and the selection of the second parameter set is during the trip.

6. The controller of claim 1, wherein the information relating to the operation of the vehicle configured using the second parameter set comprises information relating to deposits in an engine of the vehicle, and wherein the adjusting of the algorithm is responsive to the information relating to the deposits in the engine of the vehicle.

7. The controller of claim 1, wherein the information relating to the operation of the vehicle configured using the second parameter set is based on measurement data acquired by a sensor of the vehicle.

8. The controller of claim 1, wherein the at least one processor is configured to:
monitor information relating to operations of vehicles configured using respective different parameter sets of the plurality of parameter sets for a given type of route; and
based on the monitoring of the information relating to the operations of the vehicles configured using the respective different parameter sets, identify a parameter set of the different parameter sets as being optimal for the given type of route.

9. The controller of claim 8, wherein the selecting of the second parameter set for the changed route is based on the identifying.

10. The controller of claim 1, wherein the controller is separate from the vehicle, and the controller is to transmit, over a network, the second parameter set to the vehicle to cause the application of the second parameter set in the vehicle.

11. The controller of claim 10, wherein the network is a wireless network, and the controller is to transmit the second parameter set to the vehicle over the wireless network.

12. The controller of claim 1, wherein the malfunction is a malfunction of an engine or a brake of the vehicle.

13. A method of a controller that is remote from a vehicle, the method comprising:
receiving, at the controller from a client device, information of a planned route for a trip of the vehicle, the planned route comprising a plurality of route segments including a first route segment;
selecting, for use in the first route segment during the trip, a first parameter set from among a plurality of parameter sets based on the planned route of the vehicle, the plurality of parameter sets corresponding to different conditions of usage of the vehicle, wherein each parameter set of the plurality of parameter sets includes one or more parameters that control adjustment of one or more adjustable elements of the vehicle;
sending, from the controller to the vehicle over a network, the first parameter set that causes application of the first parameter set to control a setting of the one or more adjustable elements of the vehicle during the trip;
detecting, during the trip of the vehicle, a change in the planned route resulting in a changed route that includes a second route segment in place of the first route segment;
selecting, for use in the second route segment during the trip, a second parameter set from among the plurality of parameter sets based on predicting that the changed route of the vehicle includes a different condition of usage;
sending, from the controller to the vehicle over the network, the second parameter set that causes application of the second parameter set to control a setting of the one or more adjustable elements of the vehicle during the trip;
monitoring information relating to an operation of the vehicle configured using the first parameter set;
based on the monitoring, adjusting, by the controller, an algorithm that maps different conditions of usage of vehicles to respective different parameter sets; and
configuring, by the controller, another vehicle using the adjusted algorithm.

14. The method of claim 13, further comprising:
dividing the planned route into the plurality of route segments, wherein the dividing comprises:
predicting a first expected condition of usage of the vehicle for the first route segment, and
predicting a different second expected condition of usage of the vehicle for a third route segment that is part of the plurality of route segments.

15. The method of claim 13, wherein the different conditions of usage of the vehicle comprise different altitudes at which the vehicle is to be operated, and wherein the first parameter set is for a first altitude of the different altitudes, the method comprising:
predicting that the changed route of the vehicle includes a second altitude of the different altitudes, the second altitude being different from the first altitude, wherein the second parameter set is for the second altitude.

16. The method of claim 13, further comprising:
detecting, by the controller, that the vehicle has experienced a malfunction; and
in response to the detecting that the vehicle has experienced the malfunction, selecting, by the controller, a safe-mode parameter set to control the setting of the one or more adjustable elements of the vehicle.

17. A non-transitory machine-readable storage medium comprising instructions that upon execution cause a controller to:
receive, from a client device, information of a planned route for a trip of a vehicle, the planned route comprising a plurality of route segments including a first route segment;
select, for use in the first route segment during the trip, a first parameter set from among a plurality of parameter sets based on the planned route of the vehicle, the plurality of parameter sets corresponding to different conditions of usage of the vehicle, wherein each parameter set of the plurality of parameter sets includes one or more parameters that control adjustment of one or more adjustable elements of the vehicle;
after selecting the first parameter set for the first route segment, detect, during the trip of the vehicle, a change in the planned route resulting in a changed route that includes a second route segment in place of the first route segment;

select, for use in the second route segment during the trip, a second parameter set from among the plurality of parameter sets based on the changed route of the vehicle;
cause application of the second parameter set during the trip to control a setting of the one or more adjustable elements of the vehicle;
detect that the vehicle has experienced a malfunction;
in response to the detecting that the vehicle has experienced the malfunction, select a safe-mode parameter set to control the setting of the one or more adjustable elements of the vehicle;
monitor information relating to an operation of the vehicle configured using the second parameter set;
based on the monitoring, adjust an algorithm that maps different conditions of usage of vehicles to respective different parameter sets; and
configure another vehicle using the adjusted algorithm.

18. The non-transitory machine-readable storage medium of claim 17, wherein the different conditions of usage of the vehicle comprise different altitudes at which the vehicle is to be operated, wherein the first parameter set is for a first altitude of the different altitudes, and wherein the instructions upon execution cause the controller to select the second parameter set based on predicting that the second route segment includes a second altitude of the different altitudes, the second altitude being different from the first altitude.

* * * * *